(12) United States Patent
Mukherjee et al.

(10) Patent No.: US 9,674,498 B1
(45) Date of Patent: Jun. 6, 2017

(54) DETECTING SUITABILITY FOR CONVERTING MONOSCOPIC VISUAL CONTENT TO STEREOSCOPIC 3D

(71) Applicant: Google Inc., Mountain View, CA (US)

(72) Inventors: Debargha Mukherjee, Sunnyvale, CA (US); Chen Wu, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 358 days.

(21) Appl. No.: 13/840,623

(22) Filed: Mar. 15, 2013

(51) Int. Cl.
*H04N 13/02* (2006.01)
*H04N 13/00* (2006.01)

(52) U.S. Cl.
CPC ........... *H04N 13/00* (2013.01); *H04N 13/026* (2013.01)

(58) Field of Classification Search
CPC .................................................... H04N 13/026
See application file for complete search history.

(56) References Cited

U.S. PATENT DOCUMENTS

| | | | |
|---|---|---|---|
| 6,785,329 B1 | 8/2004 | Pan et al. | |
| 7,660,439 B1 | 2/2010 | Lu et al. | |
| 7,860,162 B2* | 12/2010 | Yokomitsu | G06T 7/246 348/699 |
| 8,213,711 B2 | 7/2012 | Tam et al. | |
| 8,249,333 B2 | 8/2012 | Agarwal et al. | |
| 8,330,801 B2 | 12/2012 | Wang et al. | |
| 8,411,931 B2 | 4/2013 | Zhou et al. | |
| 8,421,847 B2* | 4/2013 | Hsiao | H04N 13/0264 348/42 |
| 8,488,868 B2 | 7/2013 | Tam et al. | |
| 8,531,507 B2* | 9/2013 | Provitola | G02C 7/02 348/53 |
| 8,644,596 B1 | 2/2014 | Wu et al. | |
| 8,666,146 B1* | 3/2014 | Smolic | G06T 3/0093 348/42 |
| 8,953,874 B2 | 2/2015 | Wu et al. | |
| 9,380,283 B2* | 6/2016 | Ko | H04N 13/0003 |
| 9,478,196 B2* | 10/2016 | Liu | G09G 5/14 |
| 2002/0048395 A1 | 4/2002 | Harman et al. | |
| 2002/0191841 A1 | 12/2002 | Harman | |
| 2005/0053276 A1 | 3/2005 | Curti et al. | |
| 2005/0104964 A1 | 5/2005 | Bovyrin et al. | |

(Continued)

FOREIGN PATENT DOCUMENTS

DE    102008016553 A1    11/2009

OTHER PUBLICATIONS

Khan, et al. "Image-based material editing," ACM Transactions on Graphics, vol. 25, No. 3, pp. 654-663, Proceedings of the ACM SIGGRAPH conference, 2006. Section: 2.1.
Grundmann et al., Auto-Directed Video Stabilization with Robust L1 Optimal Camera Paths. IEEE Conference on Computer Vision and Pattern Recognition (CVPR), 2011.
Brox et al., "High Accuracy Optical Flow Estimation Based on a Theory for Warping." European Conference on Computer Vision (ECCV), 2004.

(Continued)

*Primary Examiner* — Christopher Findley
(74) *Attorney, Agent, or Firm* — Lowenstein Sandler LLP

(57) ABSTRACT

A suitability detector identifies a plurality of frames of an input video. The suitability detector determines, based on characteristics of the plurality of frames, whether the input video is suitable for conversion from monoscopic visual content to stereoscopic 3D. The characteristics may include a visual cue present in the plurality of frames and a visual quality of the plurality of frames. If the input video is suitable for conversion, an image converter converts the input video to stereoscopic 3D.

23 Claims, 12 Drawing Sheets

(56) References Cited

U.S. PATENT DOCUMENTS

| | | | |
|---|---|---|---|
| 2006/0187345 A1 | 8/2006 | Soto et al. | |
| 2006/0274302 A1 | 12/2006 | Shylanski et al. | |
| 2007/0024614 A1 | 2/2007 | Tam et al. | |
| 2007/0047809 A1 | 3/2007 | Sasaki | |
| 2007/0146232 A1 | 6/2007 | Redert et al. | |
| 2008/0199044 A1 | 8/2008 | Tsurumi | |
| 2009/0003687 A1 | 1/2009 | Agarwal et al. | |
| 2009/0116732 A1 | 5/2009 | Zhou et al. | |
| 2009/0185029 A1* | 7/2009 | Mitsuhashi | G11B 27/034 348/46 |
| 2009/0238462 A1 | 9/2009 | Feris et al. | |
| 2009/0310828 A1 | 12/2009 | Kakadiaris et al. | |
| 2009/0322860 A1 | 12/2009 | Zhang et al. | |
| 2010/0080448 A1 | 4/2010 | Tam et al. | |
| 2010/0208986 A1 | 8/2010 | Cobb et al. | |
| 2010/0215251 A1 | 8/2010 | Klein Gunnewiek et al. | |
| 2010/0316257 A1 | 12/2010 | Xu et al. | |
| 2011/0026808 A1 | 2/2011 | Kim et al. | |
| 2011/0026840 A1 | 2/2011 | Tao et al. | |
| 2011/0043540 A1 | 2/2011 | Fancher et al. | |
| 2011/0050853 A1 | 3/2011 | Zhang et al. | |
| 2011/0096832 A1 | 4/2011 | Zhang et al. | |
| 2011/0122126 A1* | 5/2011 | Han | H04N 13/0454 345/419 |
| 2011/0150287 A1 | 6/2011 | Flosdorf et al. | |
| 2011/0181588 A1 | 7/2011 | Barenbrug et al. | |
| 2011/0210969 A1 | 9/2011 | Barenbrug | |
| 2011/0242279 A1 | 10/2011 | Redert et al. | |
| 2011/0255775 A1* | 10/2011 | McNamer | G06T 7/0075 382/154 |
| 2011/0293248 A1* | 12/2011 | Toma | H04N 13/0055 386/284 |
| 2012/0013711 A1 | 1/2012 | Tamir et al. | |
| 2012/0214463 A1 | 8/2012 | Smith et al. | |
| 2012/0293624 A1 | 11/2012 | Chen et al. | |
| 2013/0106837 A1 | 5/2013 | Mukherjee et al. | |
| 2013/0147911 A1 | 6/2013 | Karsch et al. | |
| 2013/0176445 A1 | 7/2013 | Streeter et al. | |
| 2013/0215239 A1* | 8/2013 | Wang | G06T 7/0071 348/50 |

OTHER PUBLICATIONS

Zhang et al., "Shape from shading: a survey." IEEE Transactions on Pattern Analysis and Machine Intelligence 21, 8, 690, 1999.

Zhang et al., "Consistent Depth Maps Recovery from a Video Sequence". IEEE Transactions on Pattern Analysis and Machine Intelligence (TPAMI), 31 (6): 974-988, 2009.

Fehn, C., "Depth-image-based rendering (DIBR), compression, and transmission for a new approach on 3D-TV," Stereoscopic Displays and Virtual Reality Systems XI., vol. 5291, pp. 93-104, May 2004.

Langer et al. "Depth Discrimination from shading under diffuse lighting." Perception vol. 29, pp. 649-660, 2000.

Saxena et al. "3D-Depth Reconstruction from a Single Still Image" International Journal of Computer Vision (IJCV), 2007.

A. Saxena, M. Sun, and A.Ng. Make3D: Learning 3D Scene Structure from a Single Still Image. IEEE Transactions on Pattern Analysis and Machine Intelligence (TPAMI), 2008.

A. Torralba, R. Fergus, W.T. Freeman, "80 million tiny images: a large dataset for non-parametric object and scene recognition", IEEE Transactions on Pattern Analysis and Machine Intelligence, vol. 30(11), 2008.

B. Liu, S. Gould, and D. Koller. Single Image Depth Estimation From Predicted Semantic Labels. IEEE Conference on Computer Vision and Pattern Recognition (CVPR), 2010.

M. Guttmann, L. Wolf, and D. Cohen-Or. Semi-Automatic Stereo Extraction From Video Footage. IEEE International Conference on Computer Vision (ICCV), 2009.

M. Liao, J. Gao, R. Yang, and M. Gong. Video Stereolization: Combining Motion Analysis with User Interaction. IEEE Transactions on Visualization and Computer Graphics (TVCG), 2011.

International Search Report and Written Opinion for PCT/US2012/063435, mailed Dec. 27, 2012.

USPTO; Office Action for U.S. Appl. No. 13/478,449 mailed Oct. 4, 2013.

USPTO; Notice of Allowance for U.S. Appl. No. 13/527,415, mailed Sep. 27, 2013.

Sergey Weinstein, "3-D Stereoscopic Reconstruction using Structured Light, May 19, 2006,http://cslab1.bc.edu/-csacademics/pdf/06SergeyWeinstein.pdf".

* cited by examiner

DETECTING SUITABILITY FOR CONVERTING MONOSCOPIC VISUAL CONTENT TO STEREOSCOPIC 3D

TECHNICAL FIELD

This disclosure relates to the field of image processing and, in particular, to detecting suitability for converting monoscopic visual content to stereoscopic 3D.

BACKGROUND

Advances in display technology have caused display devices capable of conveying a stereoscopic perception of three-dimensional (3D) depth to a view to become increasingly common. These 3D displays may be found in high-definition (HD) television sets, gaming devices, and other computing devices. The growing number of 3D displays has led to a need for additional 3D visual content (e.g., images, video). Conventionally, creating 3D content has been a difficult and time consuming process. A content creator, for example, would capture a subject using two cameras, combine the video or images from each camera, and use special software to make the 3D effect look accurate. This typically includes a lengthy, highly technical and expensive manual process. Conversion of two-dimensional (2D) images and video to 3D has been performed; however, conventional conversion techniques may not be efficient at converting a large number of images or video. In addition, determining whether a piece of visual content is suitable for conversion to stereoscopic 3D has previously relied on an examination of metadata associated with the content, which is notoriously unreliable, or has been a time consuming manual inspection process.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one implementation, a suitability detector identifies a plurality of frames of an input video. The suitability detector determines, based on characteristics of the plurality of frames, whether the input video is suitable for conversion from monoscopic visual content to stereoscopic 3D. The characteristics may include a visual cue present in the plurality of frames and a visual quality of the plurality of frames. If the input video is suitable for conversion, an image converter converts the input video to stereoscopic 3D. The visual quality of the plurality of frames may be based on at least one of an average quantizer step size of the plurality of frames, a video resolution of the plurality of frames or a noise level of the plurality of frames In one implementation, the visual cue may be a histogram cue, and determining whether the input video is suitable for conversion includes generating a first color histogram for a first portion of each of the plurality of frames, a second color histogram for a second portion of each of the plurality of frames, a third color histogram for a third portion of each of the plurality of frames and a fourth color histogram for a fourth portion of each of the plurality of frames. The suitability detector determines a first histogram distance between the first color histogram and the second color histogram and a second histogram distance between the third color histogram and the fourth color histogram for each of the plurality of frames and calculates the histogram cue based on an average first histogram distance and an average second histogram distance for the plurality of frames. The suitability detector compares the histogram cue to a plurality of histogram thresholds to determine whether each of the plurality of frames comprises a stereo image pair. The histogram cue may include the average second histogram distance minus the average first histogram distance divided by the sum of the average histogram distances.

In one implementation visual cue may be an edge cue and determining whether the input video is suitable for conversion may include identifying two center columns and two center rows in each of the plurality of frames, determining a fraction of pixels in the center columns and center rows that comprise edge pixels in each of the plurality of frames and calculating an edge cue based on an average fraction of edge pixels in the center columns and an average fraction of edge pixels in the center rows for the plurality of frames. The suitability detector may compare the edge cue to a plurality of edge thresholds to determine whether each of the plurality of frames comprises a stereo image pair. The edge cue may include the average fraction of edge pixels in the center columns minus the average fraction of edge pixels in the center rows divided by the sum of the average fractions of edge pixels.

In one implementation visual cue may include a separator cue, and determining whether the input video is suitable for conversion may include identifying two center columns and two center rows in each of the plurality of frames, determining a fraction of pixels in the center columns and center rows that have a same color value as an adjacent pixel in the center columns or center rows in each of the plurality of frames and determining a number of the plurality of frames where the fraction of pixels in the center columns or center rows exceeds a first threshold. The suitability detector can calculate a separator cue based on the number of frames where the fraction of pixels in the center columns or center rows exceeds the first threshold and compare the separator cue to a plurality of separator thresholds to determine whether each of the plurality of frames comprises a stereo image pair.

BRIEF DESCRIPTION OF THE DRAWINGS

The present disclosure is illustrated by way of example, and not by way of limitation, in the figures of the accompanying drawings.

DETAILED DESCRIPTION

Figure 1:
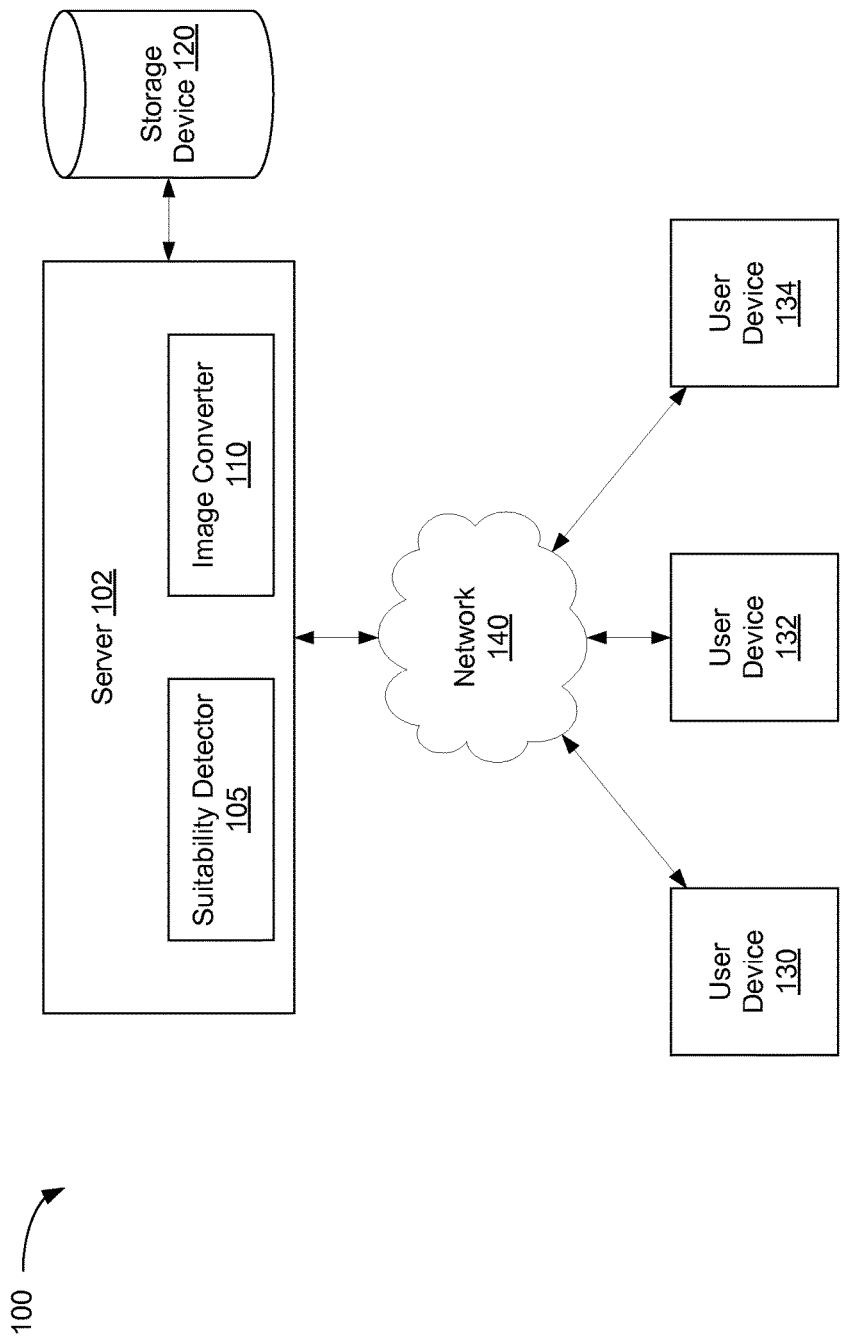
FIG. 1 is a block diagram illustrating an exemplary network architecture in which implementations of the present disclosure may be implemented.

Implementations are described for detecting suitability for converting monoscopic visual content to stereoscopic 3D. In one implementation, a suitability detector receives an input video. The input video may have been recently uploaded to a media server by a user, or may be selected from a data store of previously uploaded videos. Generally, that status of input video, as either monoscopic (i.e., two-dimensional) or stereoscopic (i.e., three-dimensional) is unknown. In one implementation, the input video may include metadata, such as frame packing arrangement (FPA) information, that indicates whether the frames of the video have a stereo image pair arrangement (i.e., whether the video is in 3D). However, in many cases, this metadata may not be present, and in others in may not be accurate. Aspects of the present disclosure overcome this deficiency by determining whether the input video is suitable for conversion using visual cues from the frames themselves.

In one implementation, in order to make a decision on the suitability for conversion, the suitability detector determines whether the input video is monoscopic, whether the input video is of a sufficient quality for conversion, and whether the input video is short enough to work well as a 3D video. Generally, there is no need to convert a video that is already in 3D, and it is preferable to convert videos of higher quality. In addition, certain videos that are too long may not be appropriate for conversion to 3D due to the possible eye strain associated with viewing 3D videos for an extended period of time.

In order to determine whether the input video is monoscopic, the suitability detector may generate one or more visual cues, such as a histogram cue, an edge cue, a separator cue, or other cues. The suitability detector may compare these visual cues to one or more corresponding thresholds in order to make the determination of whether the video is monoscopic or stereoscopic. In general, the visual cues are used to determine whether a single frame of the input video actually contains multiple images, arranged as a stereo image pair, in a known configuration (e.g., left/right or top/bottom). In one implementation, the histogram cue is based on the color values of pixels found in left and right sections, as well as top and bottom sections of a video frame. If the frame includes a stereo image pair, it is expected that the pixels in each half of the frame include similar color values, since the images in the stereo image pair are of the same scene, but from a slightly shifted viewpoint. The edge cue is based on the presence of an edge that can be found in either the horizontal center or the vertical center of a frame. If the frame includes a stereo image pair, there will likely be an edge between the images that should fall in the center of the frame. The separator cue is based on the presence of a constant color separator in the center of the frame. Similar to the edge discussed above, certain frames with a stereo image pair may have a border or other separator between the images that is one solid color. Detecting this separator can be useful in determining whether the frame includes a stereo image pair. Some implementations of these visual cues are discussed in more detail below.

The suitability detection mechanisms described herein can allow for automatic determination of whether a particular video is suitable for conversion to stereoscopic 3D. This prevents the costly and time-consuming exercise of manually examining each video to determine whether it should be converted. The techniques used herein also reduce the number of errors made by relying on metadata associated with the videos, which may be untrustworthy. In turn, this may reduce the unnecessary use of time and resources in converting videos that are not suitable for conversion to stereoscopic 3D.

FIG. 1 is a block diagram illustrating an exemplary network architecture in which implementations of the present disclosure may be implemented. The network architecture 100 may include one or more servers 102 communicating with one or more user devices 130, 132, 134 over one or more networks 140, according to one implementation. Network 140 can be a local area network (LAN), a wireless network, a telephone network, a mobile communications network, a wide area network (WAN), such as the Internet, or similar communication system. User devices 130, 132, 134 may be any type of computing device including server computers, gateway computers, desktop computers, laptop computers, mobile communications devices, cell phones, smart phones, hand-held computers, tablets, or similar computing devices. The user devices 130, 132, 134 may be variously configured with different features to enable viewing of visual content, such as images, videos, etc.

Server 102 may include a network-accessible server-based functionality, various data stores, and/or other data processing equipment. The server 102 may be implemented by a single machine or a cluster of machines. Server 102 may include, for example, computer system 1200 of FIG. 12. In one implementation, server 102 includes suitability detector 105 and image converter 110. Suitability detector 105 can receive an input image or video (i.e., a series of images or frames) and determine whether the input image or video is suitable for conversion from monoscopic 2D to stereoscopic 3D. The determination may be based on, for example, whether the input video is currently monoscopic or stereoscopic, the quality of the video and/or the length of the video. Some implementations of suitability detector 105 are discussed in more detail below.

Image converter 110 can receive a two-dimensional input image (e.g., from a user or a computer application program) that is to be converted to a three-dimensional output image. In one implementation, image converter 110 can automatically generate the three-dimensional output image. Image converter 110 can use, for example, similar images from a data store and a corresponding feature-to-depth mapping database, an example approximated depth-map associated with an example similar image, motion cues, an image-depth database, or other similar technique. Additional details regarding the automatic conversion of monoscopic visual content to stereoscopic 3D are not provided herein, so as not to obscure the present invention.

In one implementation, storage device 120 includes an image data store including a number of 2D and 3D videos. Storage device 120 may additionally include data and/or metadata used and/or created by suitability detector 105 during the suitability detection process. For example, suitability detector 105 may generate multiple cues, such as histogram cues, edge cues, or separator cues, that may be used in determining whether the frames of a video are currently in a recognized stereoscopic format (e.g., left-right or top-bottom image pairs). These cues, along with other information, may be stored in storage device 120.

In one implementation, server 102 may include suitability detector 105, image converter 110 and storage device 120. In another implementation, storage device 120 may be external to server 102 and may be connected to server 102 over a network or other connection. In other implementations, server 102 may include different and/or additional components which are not shown here so as not to obscure the present invention. Storage device 120 may include one or more mass storage devices which can include, for example, flash memory, magnetic or optical disks, or tape drives; read-only memory (ROM); random-access memory (RAM); erasable programmable memory (e.g., EPROM and EEPROM); flash memory; or any other type of storage medium.

Figure 2:
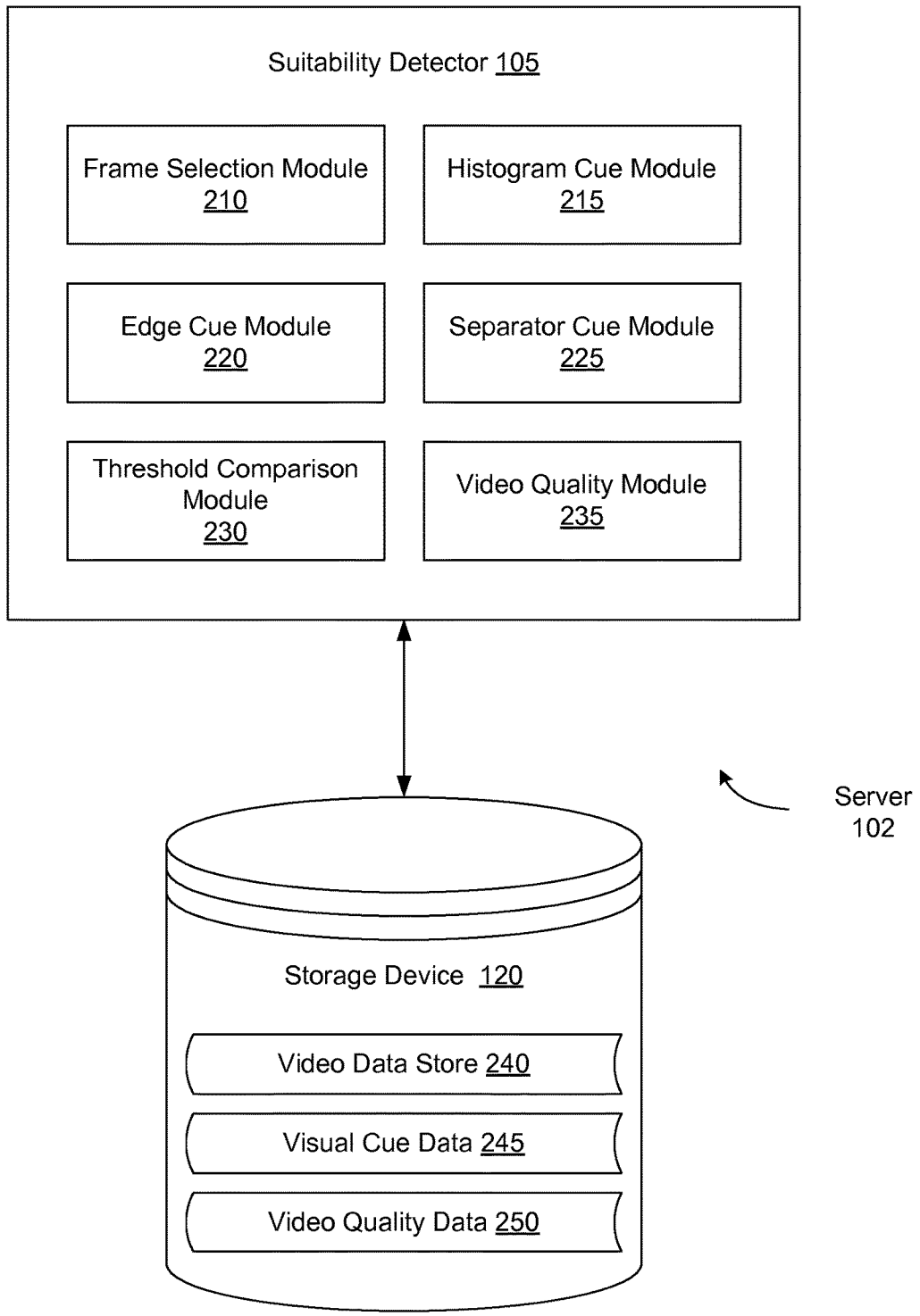
FIG. 2 is a block diagram illustrating a suitability detector for detecting suitability for converting monoscopic visual content to stereoscopic 3D, according to some implementations.

FIG. 2 is a block diagram illustrating a suitability detector for detecting suitability for converting monoscopic visual content to stereoscopic 3D, according to some implementations of the present disclosure. In one implementation, suitability detector 105 includes frame selection module 210, histogram cue module 215, edge cue module 220, separator cue module 225, threshold comparison module 230 and video quality module 235. This arrangement of modules may be a logical separation, and in other implementations, these modules or other components can be combined together or separated in further components, according to a particular implementation. In one implementation, storage device 120 is connected to suitability detector 105 and includes video data store 240, visual cue data 245 and video quality data 250. In one implementation, server 102 may include suitability detector 105 and storage device 120. In another implementation, storage device 120 may be external to server 102 and may be connected to server 102 over a network or other connection. In other implementations, server 102 may include different and/or additional components which are not shown to simplify the description.

In one implementation, frame selection module 210 identifies a set of representative frames from an input video from video data store 240. The number of frames in the set should be large enough to provide an accurate assessment of the quality and characteristics of frames throughout the input video. In one implementation, frame selection module 210 may identify a predetermined number of frames (e.g., 100 frames or 500 frames). This number of frames may be, for example, the first 500 frames of the video, 500 consecutive frames from somewhere in the middle or the end of the video, 500 randomly selected non-consecutive frames from throughout the video, or 500 specifically identified key frames (i.e., frames that define that starting and ending points of a transition in the video). In another implementation, frame selection module 210 may identify some percentage of the total frames in the video for use as the set of representative frames.

In one implementation, histogram cue module 215 generates a histogram cue using the set of frames identified by frame selection module 210. The histogram cue is based on the colors present in certain sections of the representative frames. For example, histogram cue module 215 can divide each of the set of frames into left and right halves, as well as top and bottom halves. For each of the halves, histogram cue module 215 can generate a suitably binned color histogram representing the number of pixels in each half that have certain color values. Histogram cue module 215 can determine a histogram distance between the histograms created for each corresponding half (i.e., left/right and top/bottom), and compute a histogram cue based on the histogram distances. The histogram cue may be stored in visual cue data 245. Some implementations of histogram cue module 215 are discussed in more detail below.

In one implementation, edge cue module 220 generates an edge cue using the set of frames identified by frame selection module 210. The edge cue is based on the presence of an image edge found in the center rows or the center columns of the selected frames. For example, edge cue module 220 can identify the center rows and center columns of each frame. Along each of the center rows and center columns, edge cue module 220 compares the colors of adjacent pixels using an edge detector to determine a fraction of the pixels that are identified as edge pixels. Edge cue module 220 can determine an average fraction of the pixels that are identified as edge pixels across the set of selected frames, and compute the edge cue based on the average fraction. The edge cue may be stored in visual cue data 245. Some implementations of edge cue module 220 are discussed in more detail below.

In one implementation, separator cue module 225 generates a separator cue using the set of frames identified by frame selection module 210. The separator cue is based on the presence of constant-color separator found in the vertical center or the horizontal center of the frames. For example, separator cue module 225 can identify the center rows and center columns of each frame. Along each of the center rows and center columns, separator cue module 225 compares the colors of adjacent pixels to determine a fraction of the adjacent pixels that have the same color value. Separator cue module 225 can compare the fraction to a separator threshold to assign a separator value to each frame. In one implementation, if the fraction of same color pixels is greater than or equal to the separator threshold, the separator value may be 1 (or some other high value). Otherwise, the separator value may be zero (or some other low value). Separator cue module 225 can count the number of positive separator values across the set of selected frames, and compute the separator cue based on that number. The separator cue may be stored in visual cue data 245. Some implementations of separator cue module 225 are discussed in more detail below.

In one implementation, threshold comparison module 230 can compare the visual cues discussed above (i.e., histogram cue, edge cue, separator cue) to one or more corresponding thresholds to determine if the set of frames are stereoscopic (i.e., having a left/right or top/bottom stereo image pair orientation) or monoscopic. In one implementation, if a certain cue is greater than a corresponding stereo threshold, threshold comparison module 230 may identify the video as stereoscopic having a left/right stereo image pair orientation. If the cue is less than a corresponding negative stereo threshold, threshold comparison module 230 may identify the video as stereoscopic having a top/bottom stereo image pair orientation. If the cue is less than a corresponding mono threshold, threshold comparison module 230 may identify the video as monoscopic.

In one implementation, video quality module 235 can identify the quality of the input video using the set of frames identified by frame selection module 210. The video quality may be based on, for example, a resolution of the input video, an estimated noise level of the video, and/or a quantizer step size of the frames in the video. In one implementation, video quality module 235 may identify the resolution of the video from metadata associated with the video and compare the resolution to a resolution threshold. Video quality module 235 may estimate the noise level of the video using a noise estimator and compare the noise estimate to a noise threshold. In addition, video quality module 235 may decode the set of frames and determine an average quantizer step size. In general, most video encoders use a transform followed by quantization. The step size of the quantizer may determine how much loss is encountered. Typically the quantizer step size varies over the video for each frame and for each block within the frame. By decoding a video, and gathering statistics, video quality module 235 may obtain a metric, such as the average quantizer step size over the video. For each format, video quality module 235 can compare the average quantizer step size against a threshold to determine if the quality of the video is good enough to be considered for 3D conversion. In general, if the average quantizer step size is large, then the video is of bad quality, and if the average size is small, then it has better quality.

Figure 3A:
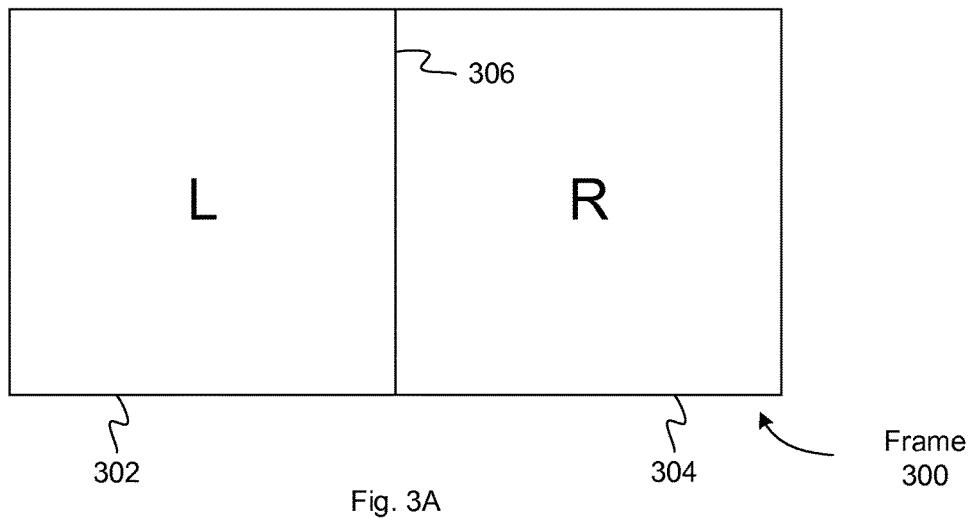
FIGS. 3A-3C are diagrams illustrating example formats for video frames including stereoscopic image pairs, according to some implementations.
Figure 3B:
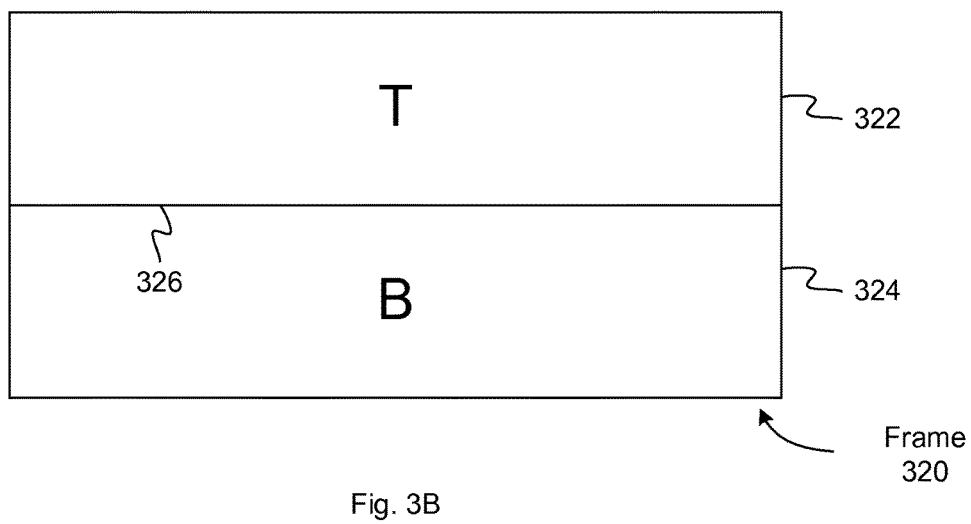
Figure 3C:
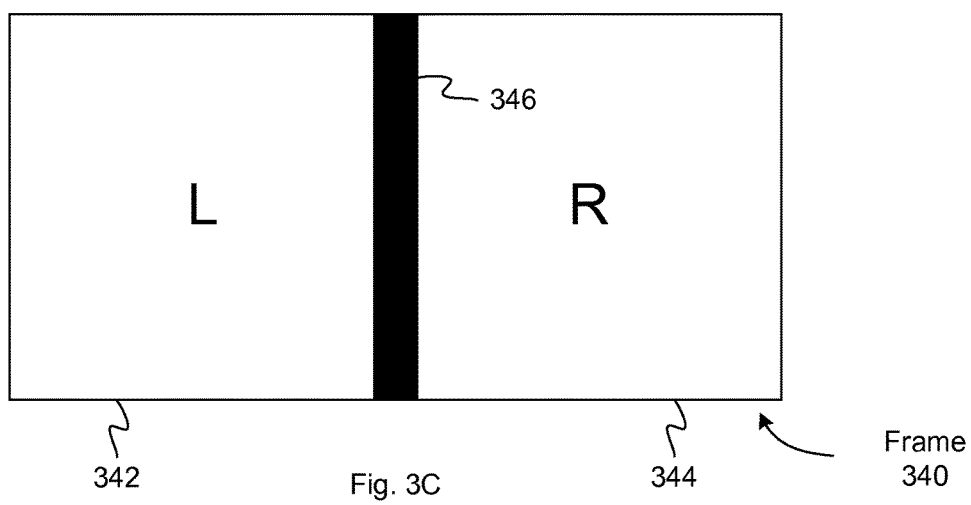

FIGS. 3A-3C are diagrams illustrating example formats for video frames including stereoscopic image pairs, according to some implementations. FIG. 3A illustrates a frame 300 that includes a left image 302 and a right image 304. Together, the left image 302 and the right image 304 make up the stereo image pair. Accordingly, frame 300 can be referred to as having a "left/right" configuration. Frame 300 also includes an edge 306 that runs vertically down the center of the frame. Edge 306 is the location where the left image 302 ends and right image 304 begins.

FIG. 3B illustrates a frame 320 that includes a top image 322 and a bottom image 324. In this implementation, the top image 322 and the bottom image 324, together, make up the stereo image pair. Accordingly, frame 320 can be referred to as having a "top/bottom" configuration. Frame 320 also includes an edge 326 that runs horizontally through the center of the frame.

FIG. 3C illustrates a frame 340 that is also in the left/right configuration. Rather than just and edge between the left image 342 and the right image 344, frame 340 includes a constant color separator 346. Constant color separator 346 may include two or more columns of pixels that all have the same color value. The constant color separator 346 serves as a clear visual delineator between the left image 342 and the right image 344. A frame in the top/bottom configuration could have a similar separator running horizontally through the center of the frame.

Figure 4:
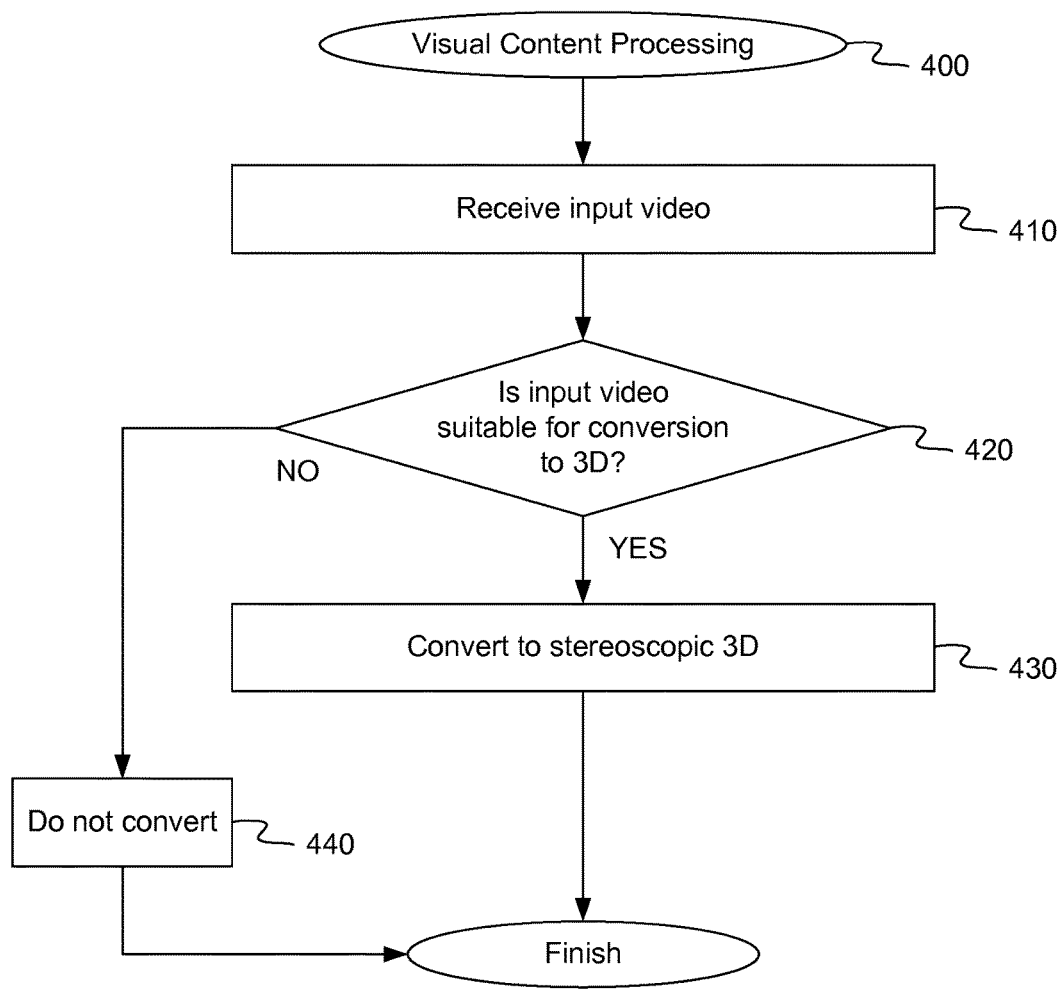
FIG. 4 is a flow diagram illustrating a visual content processing method, according to some implementations.

FIG. 4 is a flow diagram illustrating a visual content processing method, according to some implementations of the present disclosure. The method 400 may be performed by processing logic that comprises hardware (e.g., circuitry, dedicated logic, programmable logic, microcode, etc.), software (e.g., instructions run on a processing device to perform hardware simulation), or a combination thereof. The method 400 can be used to process a received unit of visual content (e.g., a video) and automatically determine whether the content is suitable for conversion from 2D to stereoscopic 3D. For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. In one implementation, method 400 may be performed by suitability detector 105, as shown in FIGS. 1 and 2.

Referring to FIG. 4, at block 410, method 400 receives an input video. The input video may have been recently uploaded to a media server by a user, or may be selected from a data store of previously uploaded videos.

At block 420, method 400 determines whether the input video is suitable for conversion to 3D. In one implementation, suitability detector 105 determines whether the input video is monoscopic, whether the input video is of a sufficient quality for conversion, and whether the input video is short enough to work well as a 3D video. Generally, there is no need to convert a video that is already in 3D, and it is preferable to convert videos of higher quality. In addition, certain videos that are too long may not be appropriate for conversion to 3D.

If at block 420, method 400 determines that the input video is suitable for conversion to 3D, at block 430, method 400 automatically converts the input video to stereoscopic 3D. In one implementation, image converter 110 can automatically generate a three-dimensional output image for each frame of the input video. Image converter 110 can use, for example, similar images from a data store and a corresponding feature-to-depth mapping database, an example approximated depth-map associated with an example similar image, motion cues, an image-depth database, or other similar technique. If at block 420, method 400 determines that the input video is not suitable for conversion to 3D, at block 440, method 400 does not convert the input video to 3D and method 400 ends.

Figure 5:
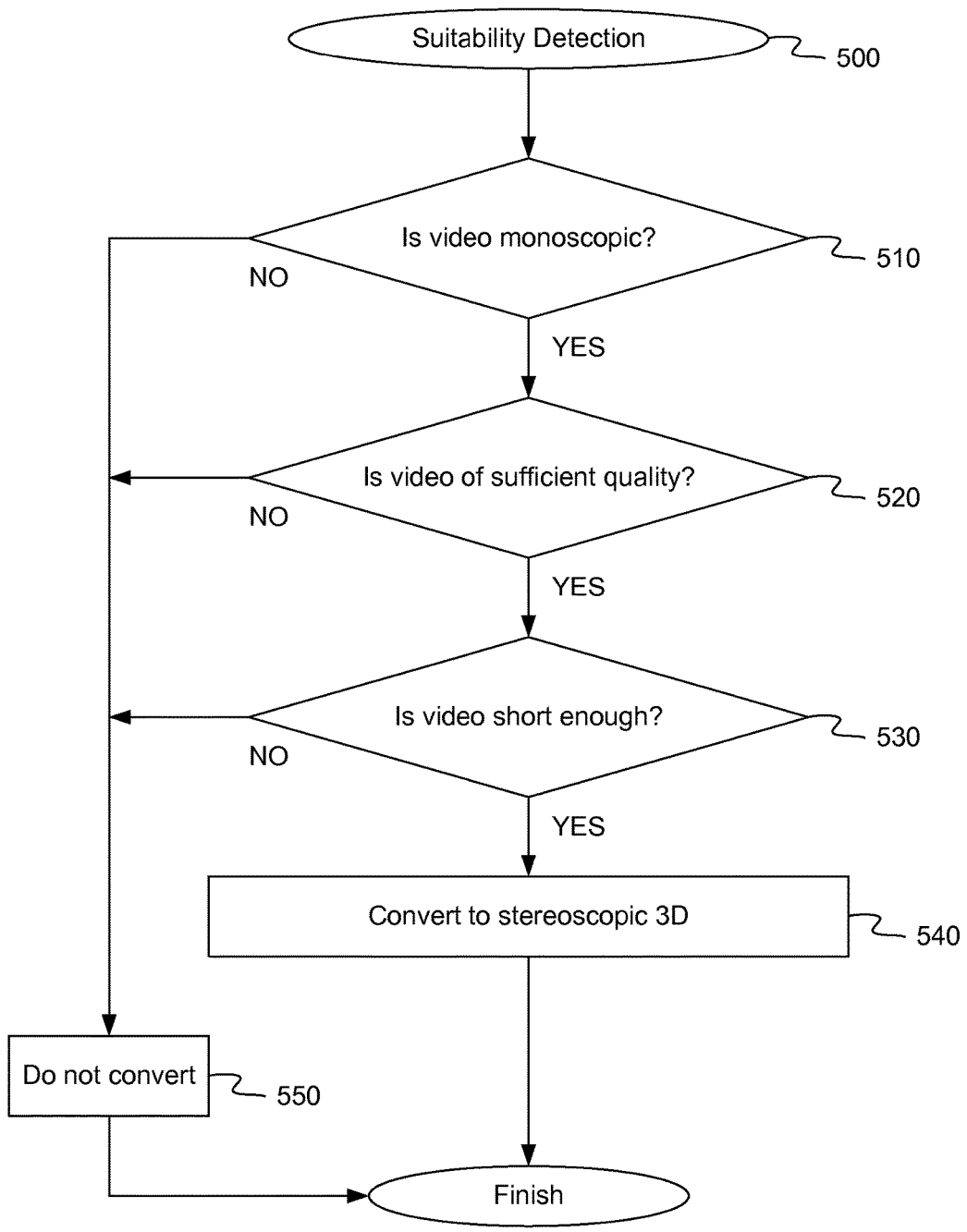
FIG. 5 is a flow diagram illustrating a suitability detection method, according to some implementations.

FIG. 5 is a flow diagram illustrating a suitability detection method, according to some implementations of the present disclosure. The method 500 may be performed by processing logic that comprises hardware (e.g., circuitry, dedicated logic, programmable logic, microcode, etc.), software (e.g., instructions run on a processing device to perform hardware simulation), or a combination thereof. The method 500 can automatically determine suitability for converting monoscopic visual content to stereoscopic 3D. In one implementation, method 500 may be performed by suitability detector 105, as shown in FIGS. 1 and 2.

Referring to FIG. 5, at block 510, method 500 determines whether the input video is monoscopic. In one implementation, in order to determine whether the input video is monoscopic, suitability detector 105 may generate one or more visual cues, such as a histogram cue, an edge cue, a separator cue, or other cues. Suitability detector 105 may compare these visual cues to one or more corresponding thresholds in order to make the determination of whether the video is monoscopic or stereoscopic.

If at block 510, method 500 determines that the input video is monoscopic, at block 520, method 500 determines whether the input video is of sufficient quality. In one implementation, video quality module 235 can identify the quality of the input video using the set of frames identified by frame selection module 210. The video quality may be based on, for example, a resolution of the input video, an estimated noise level of the video, and/or a quantizer step size of the frames in the video.

If at block 520, method 500 determines that the input video is of sufficient quality, at block 530, method 500 determines whether the input video is short enough. In one implementation, suitability detector 105 compares the length (i.e., playing time) of the video to a time threshold. In one implementation, the time threshold may be three minutes. In other implementations, however, the time threshold may be some other length of time. If the length of the video is less than or equal to the time threshold, suitability detector 105 may determine that the video is short enough for conversion to 3D.

If at block 530, method 500 determines that the input video is short enough, at block 540, method 500 automatically converts the input video to stereoscopic 3D. If at blocks 510, 520 or 530, method 500 determines that the input video is not monoscopic, is not of sufficient quality or is not long enough, at block 550, method 500 does not convert the input video to 3D and method 500 ends.

Figure 6:
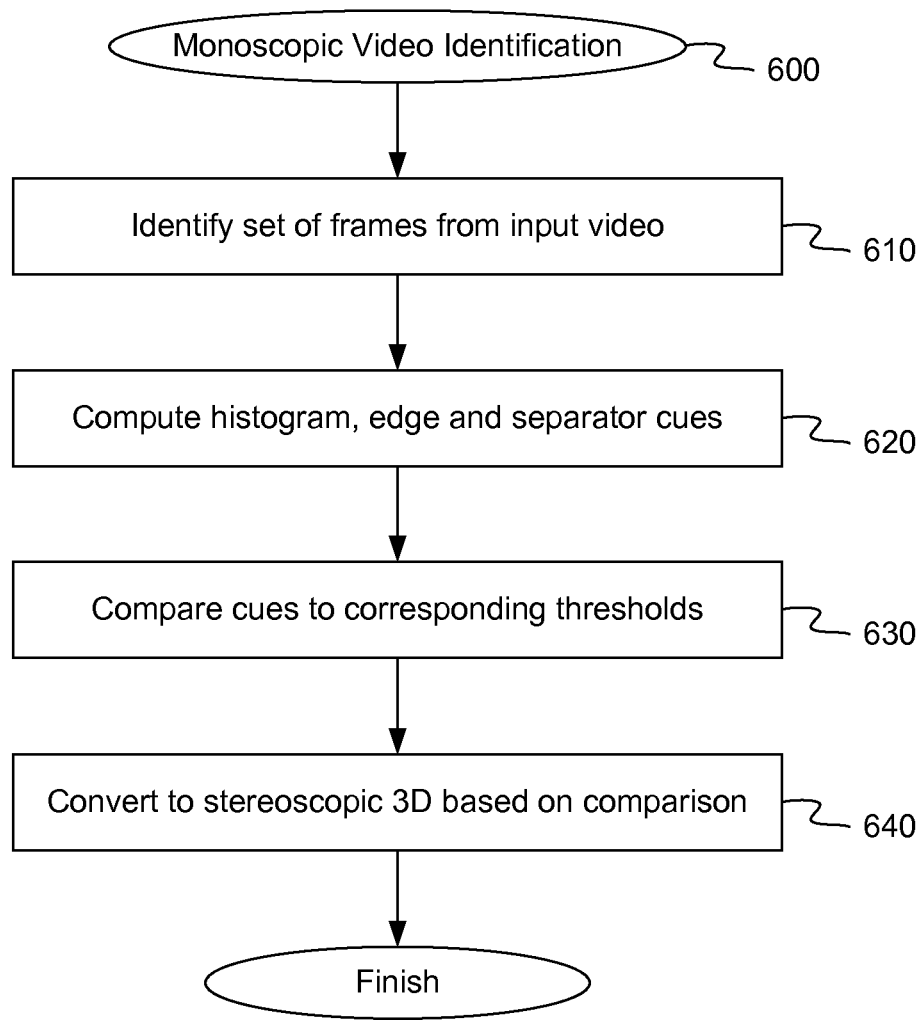
FIG. 6 is a flow diagram illustrating a monoscopic video identification method, according to some implementations.

FIG. 6 is a flow diagram illustrating a monoscopic video identification method, according to some implementations of the present disclosure. The method 600 may be performed by processing logic that comprises hardware (e.g., circuitry, dedicated logic, programmable logic, microcode, etc.), software (e.g., instructions run on a processing device to perform hardware simulation), or a combination thereof. The method 600 can automatically identify whether an input video is monoscopic without relying on metadata associated with the input video. In one implementation, method 600 may be performed by suitability detector 105, as shown in FIGS. 1 and 2.

Referring to FIG. 6, at block 610, method 600 identifies a set of representative frames from an input video. In one implementation, frame selection module 210 may identify a predetermined number of frames (e.g., 100 frames or 500 frames). This number of frames may be, for example, the first 500 frames of the video, 500 consecutive frames from somewhere in the middle or the end of the video, 500 randomly selected non-consecutive frames from throughout the video, or 500 specifically identified key frames (i.e., frames that define that starting and ending points of a transition in the video). In another implementation, frame selection module 210 may identify some percentage of the total frames in the video for use as the set of representative frames.

At block 620, method 600 computes visual cues for the set of frames. In order to determine whether the input video is monoscopic, suitability detector 105 may generate one or more visual cues, such as a histogram cue, an edge cue, a separator cue, or other cues. In general, the visual cues are used to determine whether a single frame of the input video actually contains multiple images, arranged as a stereo image pair, in a known configuration (e.g., left/right or top/bottom). Histogram cue module 215, edge cue module 220 and separator cue module can generate the histogram cue, edge cue and separator cues respectively.

At block 630, method 600 compares the visual cues to corresponding cue thresholds. In one implementation, threshold comparison module 230 can compare the visual cues discussed above (i.e., histogram cue, edge cue, separator cue) to one or more corresponding thresholds to determine if the set of frames are stereoscopic (i.e., having a left/right or top/bottom stereo image pair orientation) or monoscopic. In one implementation, if a certain cue is greater than a corresponding stereo threshold, threshold comparison module 230 may identify the video as stereoscopic having a left/right stereo image pair orientation. If the cue is less than a corresponding negative stereo threshold, threshold comparison module 230 may identify the video as stereoscopic having a top/bottom stereo image pair orientation. If the cue is less than a corresponding mono threshold, threshold comparison module 230 may identify the video as monoscopic.

At block 640, method 600 automatically converts the input video to stereoscopic 3D, based on the comparisons at block 630. In general, image converter 110 will generate a stereoscopic 3D image when the input video is identified as monoscopic.

Figure 7:
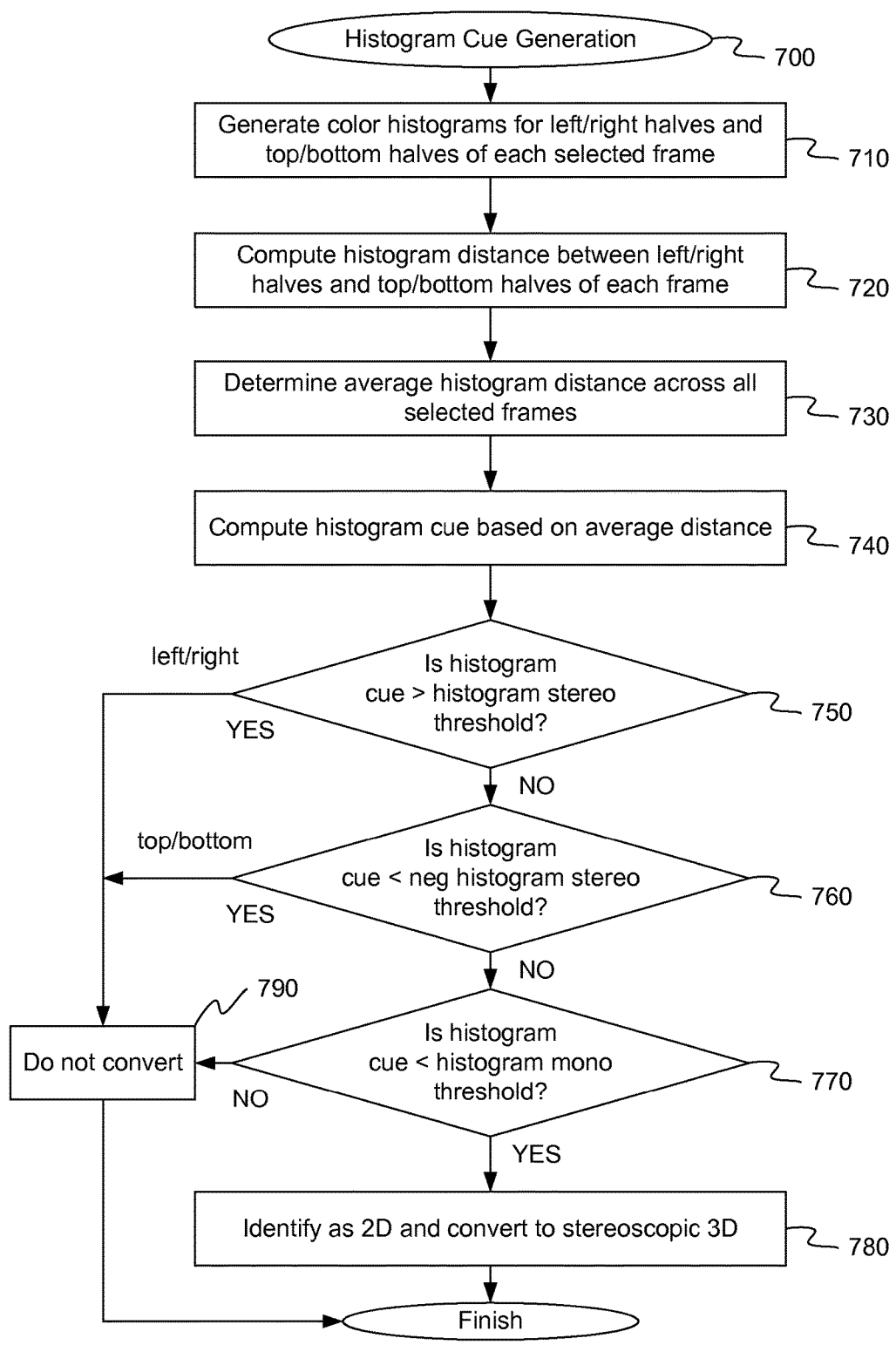
FIG. 7 is a flow diagram illustrating a histogram cue generation method, according to some implementations.

FIG. 7 is a flow diagram illustrating a histogram cue generation method, according to some implementations of the present disclosure. The method 700 may be performed by processing logic that comprises hardware (e.g., circuitry, dedicated logic, programmable logic, microcode, etc.), software (e.g., instructions run on a processing device to perform hardware simulation), or a combination thereof. The method 700 can generate a color histogram visual cue for use in determining whether an input video is monoscopic. In one implementation, method 700 may be performed by suitability detector 105, as shown in FIGS. 1 and 2.

Referring to FIG. 7, at block 710, method 700 generates color histograms for the left and right halves, as well as the top and bottom halves of each selected frame of the input video. In one implementation, histogram cue module 215 generates a histogram cue using the set of frames identified by frame selection module 210. The histogram cue is based on the colors present in certain sections of the representative frames. For example, histogram cue module 215 can divide each of the set of frames into left and right halves, as well as top and bottom halves. For each of the halves, histogram cue module 215 can generate a suitably binned color histogram representing the number of pixels in each half that have certain color values.

Figure 8:
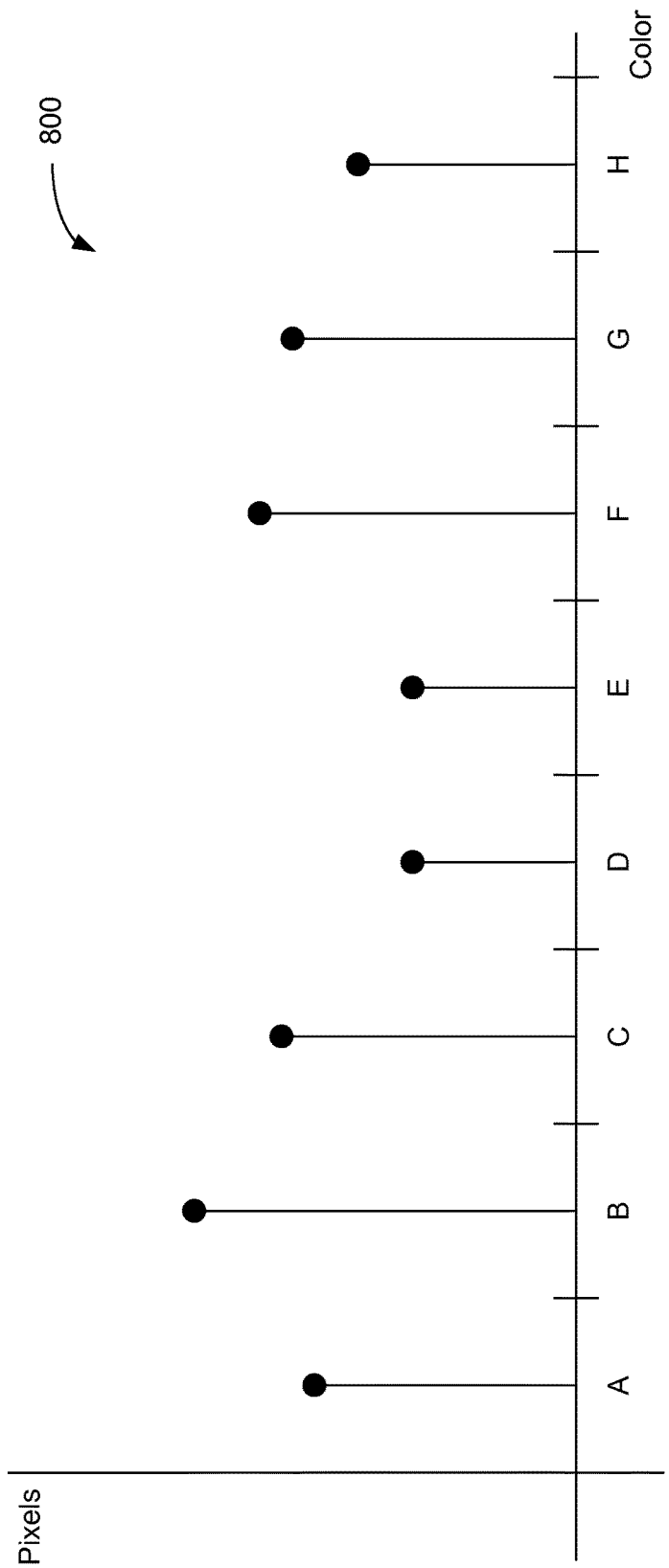
FIG. 8 is a diagram illustrating a color histogram for a stereo image pair, according to some implementations.

FIG. 8 illustrates one example of a color histogram 800. In one implementation, binning is used to reduce the number of colors represented in the histogram. YUV, for example may have a 24-bit color value, which may be too large the purposes of this histogram cue. In some cases the over 16 million different colors represented in a 24-bit color scheme may make computing the histogram cue too computationally expensive and time consuming. In FIG. 8, the color values have been reduced to eight bins (A-H), although in other implementations, some other number may be used. For one of the halves of the identified frame, the value of a bin is incremented for each pixel that has a color value corresponding to the range of color values represented by the bin. Once complete, this histogram will illustrate the number of pixels in the half of the frame that have a color value falling into each of the defined color bins. Histogram cue module 215 can generate a similar histogram for each half (e.g., left/right and top/bottom) of the frame.

Referring again to FIG. 7, at block 720, method 700 computes a histogram distance between the left and right halves, and between the top and bottom halves of each selected frame of the input video. Histogram cue module 215 can determine a histogram distance between the histograms created for each corresponding half (i.e., left/right and top/bottom). In one implementation, histogram cue module 215 can compute the histogram distance using, for example, the Hellinger distance. The Hellinger distance is a value between zero (no similarity) and one (maximum similarity) representing the similarity of two distributions (e.g., the histograms of each half of the frame generated at block 710). In other implementations, some other measure of the similarity may be used for the histogram distance.

At block 730, method 700 determines an average histogram distance across all of the selected frames of the input video. Histogram cue module 215 may calculate this average of the Hellinger distance values for the left and right halves of each frame, as well as the top and bottom halves of each frame. In other implementations, histogram cue module 215 may identify the median distance value or the most frequently occurring value (i.e., the mode), rather than the average value.

At block 740, method 700 computes a histogram cue based on the average histogram distance. In one implementation, the histogram cue is defined as the average top/bottom histogram distance minus average left/right histogram distance. That result may be divided by the sum of the average distances for the top/bottom halves and the left/right halves to normalize the histogram cue value. In general, if the frames of the input video include stereo image pairs in the left/right orientation, the average left/right histogram distance is expected to be relatively small, since each half of the frame shows the same scene from a slightly different view point. Thus, the colors in each half will be similar. In addition, if the frames of the input video include stereo image pairs in the top/bottom orientation, the average top/bottom histogram distance is expected to be relatively small. Therefore, in general, the histogram cue will likely be a positive value for frames arranged in the left/right configuration (as the average top/bottom value may be large, while the average left/right value is small). Also, the histogram cue will likely be a negative value for frames arranged in the top/bottom configuration (as the average top/bottom value is small, while the average left/right value may be large). In other implementations, the histogram cue may be calculated in some other manner.

At block 750, method 700 determines whether the histogram cue is greater than a histogram stereo threshold. In one implementation, the histogram stereo threshold is a value used to define the left/right stereo image pair configuration. Threshold comparison module 230 may compare the histogram cue computed at block 740 to the histogram stereo threshold. If the histogram cue is greater than or equal to the histogram stereo threshold, threshold comparison module 230 may determine that the input video is stereoscopic with a left/right stereo image pair orientation. The histogram stereo threshold may be an adjustable value that can be configured according to user preferences. If at block 750, method 700 determines that the histogram cue is greater than the histogram stereo threshold, method 700 identifies the input video as stereoscopic having a left/right stereo image pair orientation, and at block 790, does not convert the input video to 3D.

If at block 750, method 700 determines that the histogram cue is not greater than the histogram stereo threshold, at block 760, method 700 determines whether the histogram cue is less than a negative histogram stereo threshold. In one implementation, the negative histogram stereo threshold is a value used to define the top/bottom stereo image pair configuration. Threshold comparison module 230 may compare the histogram cue computed at block 740 to the negative histogram stereo threshold. If the histogram cue is less than or equal to the negative histogram stereo threshold, threshold comparison module 230 may determine that the input video is stereoscopic with a top/bottom stereo image pair orientation. The negative histogram stereo threshold may be an adjustable value that can be configured according to user preferences. If at block 760, method 700 determines that the histogram cue is less than the negative histogram stereo threshold, method 700 identifies the input video as stereoscopic having a top/bottom stereo image pair orientation, and at block 790, does not convert the input video to 3D.

If at block 760, method 700 determines that the histogram cue is not less than the negative histogram stereo threshold, at block 770, method 700 determines whether the histogram cue is less than a histogram mono threshold. Threshold comparison module 230 may compare the histogram cue computed at block 740 to the histogram mono threshold. If the histogram cue is less than or equal to the histogram mono threshold, threshold comparison module 230 may determine that the input video is monoscopic. The histogram stereo threshold may be an adjustable value that can be configured according to user preferences. If at block 770, method 700 determines that the histogram cue is less than the histogram mono threshold, method 700 identifies the input video as monoscopic, and at block 780, automatically converts the input video to stereoscopic 3D. If at block 770, method 700 determines that the histogram cue is not less than the histogram mono threshold, method 700 may not be able to determine whether the input video is 2D or 3D. As a result, method 700 may proceed to block 790, and not convert the input video to 3D.

Figure 9:
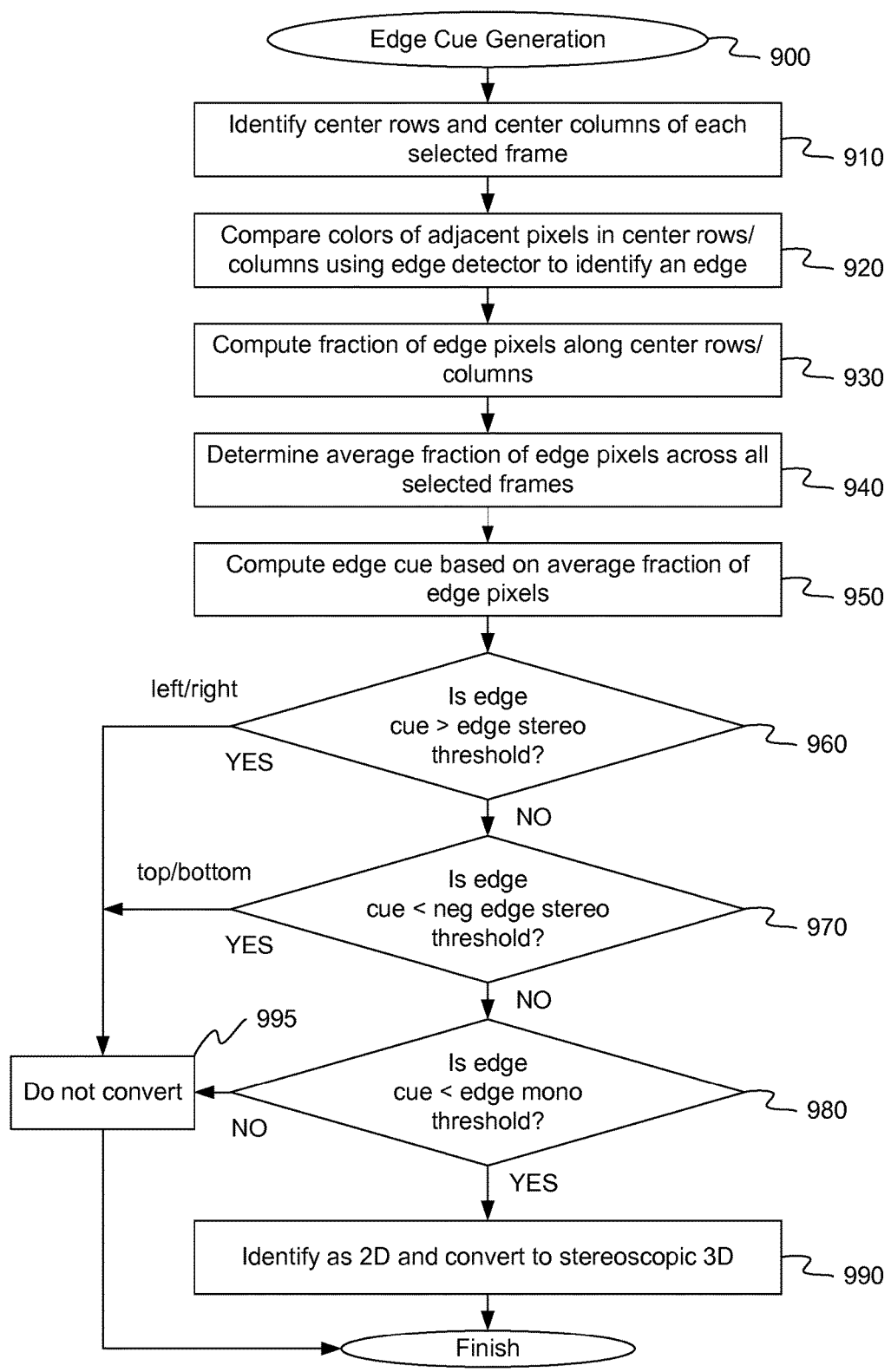
FIG. 9 is a flow diagram illustrating an edge cue generation method, according to some implementations.

FIG. 9 is a flow diagram illustrating an edge cue generation method, according to some implementations of the present disclosure. The method 900 may be performed by processing logic that comprises hardware (e.g., circuitry, dedicated logic, programmable logic, microcode, etc.), software (e.g., instructions run on a processing device to perform hardware simulation), or a combination thereof. The method 900 can generate an edge visual cue for use in determining whether an input video is monoscopic. In one implementation, method 900 may be performed by suitability detector 105, as shown in FIGS. 1 and 2.

Referring to FIG. 9, at block 910, method 900 identifies the center rows and center columns of each selected frame of the input video. In one implementation, edge cue module 220 generates an edge cue using the set of frames identified by frame selection module 210. The edge cue is based on the presence of an image edge found in the center rows or the center columns of the selected frames. For example, edge cue module 220 can identify the center rows and center columns of each frame. In one implementation, edge cue module 220 can determine the number of rows and columns of pixels in a frame (e.g., from metadata) and identify the center rows and columns. For example, if a frame has 1024 pixel columns, the center columns may be columns 512 and 513.

At block 920, method 900 compares the colors of adjacent pixels in the center rows and center columns using an edge detector to identify an edge in each selected frame of the input video. Along each of the center rows and center columns, edge cue module 220 compares the colors of adjacent pixels using an edge detector to determine a fraction of the pixels that are identified as edge pixels. Using the example above, edge cue module 220 may compare the color values of adjacent pixels in columns 512 and 513 to determine if any difference in the color values is large enough (e.g., above a certain threshold), such as to be identified as an edge. If the color values of adjacent pixels are similar, an edge may not be detected.

At block 930, method 900 computes a fraction of edge pixels along the center rows and center columns for each selected frame of the input video. In one implementation, edge cue module 220 may count the number of pixels that were identified as edge pixels at block 920 (relative to the total number of pixels in the column or row) for both the center columns and rows.

At block 940, method 900 determines an average fraction of edge pixels across all selected frames of the input video.

Edge cue module 220 can determine an average fraction of the pixels that are identified as edge pixels along the center columns and rows, across the set of selected frames. In other implementations, edge cue module 220 may identify the median fraction or the most frequently occurring fraction (i.e., the mode), rather than the average fraction.

At block 950, method 900 computes an edge cue based on the average fraction of edge pixels. In one implementation, the edge cue is defined as the average left/right edge fraction minus average top/bottom edge fraction. That result may be divided by the sum of the average edge fractions for the top/bottom halves and the left/right halves to normalize the edge cue value. In general, if the frames of the input video include stereo image pairs in the left/right orientation, the average left/right edge is expected to be relatively high, since the frame would likely be divided down the center. In addition, if the frames of the input video include stereo image pairs in the top/bottom orientation, the average top/bottom edge fraction is expected to be relatively high. Therefore, in general, the edge cue will likely be a positive value for frames arranged in the left/right configuration (as the average top/bottom fraction may be small, while the average left/right fraction is large). Also, the edge cue will likely be a negative value for frames arranged in the top/bottom configuration (as the average top/bottom fraction is large, while the average left/right fraction may be small). In other implementations, the edge cue may be calculated in some other manner.

At block 960, method 900 determines whether the edge cue is greater than an edge stereo threshold. In one implementation, the edge stereo threshold is a value used to define the left/right stereo image pair configuration. Threshold comparison module 230 may compare the edge cue computed at block 950 to the edge stereo threshold. If the edge cue is greater than or equal to the edge stereo threshold, threshold comparison module 230 may determine that the input video is stereoscopic with a left/right stereo image pair orientation. The edge stereo threshold may be an adjustable value that can be configured according to user preferences. If at block 960, method 900 determines that the edge cue is greater than the edge stereo threshold, method 900 identifies the input video as stereoscopic having a left/right stereo image pair orientation, and at block 995, does not convert the input video to 3D.

If at block 960, method 900 determines that the edge cue is not greater than the edge stereo threshold, at block 970, method 900 determines whether the edge cue is less than a negative edge stereo threshold. In one implementation, the negative edge stereo threshold is a value used to define the top/bottom stereo image pair configuration. Threshold comparison module 230 may compare the edge cue computed at block 950 to the negative edge stereo threshold. If the edge cue is less than or equal to the negative edge stereo threshold, threshold comparison module 230 may determine that the input video is stereoscopic with a top/bottom stereo image pair orientation. The negative edge stereo threshold may be an adjustable value that can be configured according to user preferences. If at block 970, method 900 determines that the edge cue is less than the negative edge stereo threshold, method 900 identifies the input video as stereoscopic having a top/bottom stereo image pair orientation, and at block 995, does not convert the input video to 3D.

If at block 970, method 900 determines that the edge cue is not less than the negative edge stereo threshold, at block 980, method 900 determines whether the edge cue is less than an edge mono threshold. Threshold comparison module 230 may compare the edge cue computed at block 740 to the edge mono threshold. If the edge cue is less than or equal to the edge mono threshold, threshold comparison module 230 may determine that the input video is monoscopic. The edge stereo threshold may be an adjustable value that can be configured according to user preferences. If at block 980, method 900 determines that the edge cue is less than the edge mono threshold, method 900 identifies the input video as monoscopic, and at block 990, automatically converts the input video to stereoscopic 3D. If at block 980, method 900 determines that the edge cue is not less than the edge mono threshold, method 900 may not be able to determine whether the input video is 2D or 3D. As a result, method 900 may proceed to block 995, and not convert the input video to 3D.

In another implementation, threshold comparison module 230 may compare the sum of the histogram cue and the edge cue to the sum of the histogram mono threshold and the edge mono threshold divided by 2. If the sum of the histogram cue and the edge cue is less than or equal to the sum of the histogram mono threshold and the edge mono threshold divided by 2, threshold comparison module 230 may determine that the input video is monoscopic. As a result, at block 990, method 900 automatically converts the input video to stereoscopic 3D.

Figure 10:
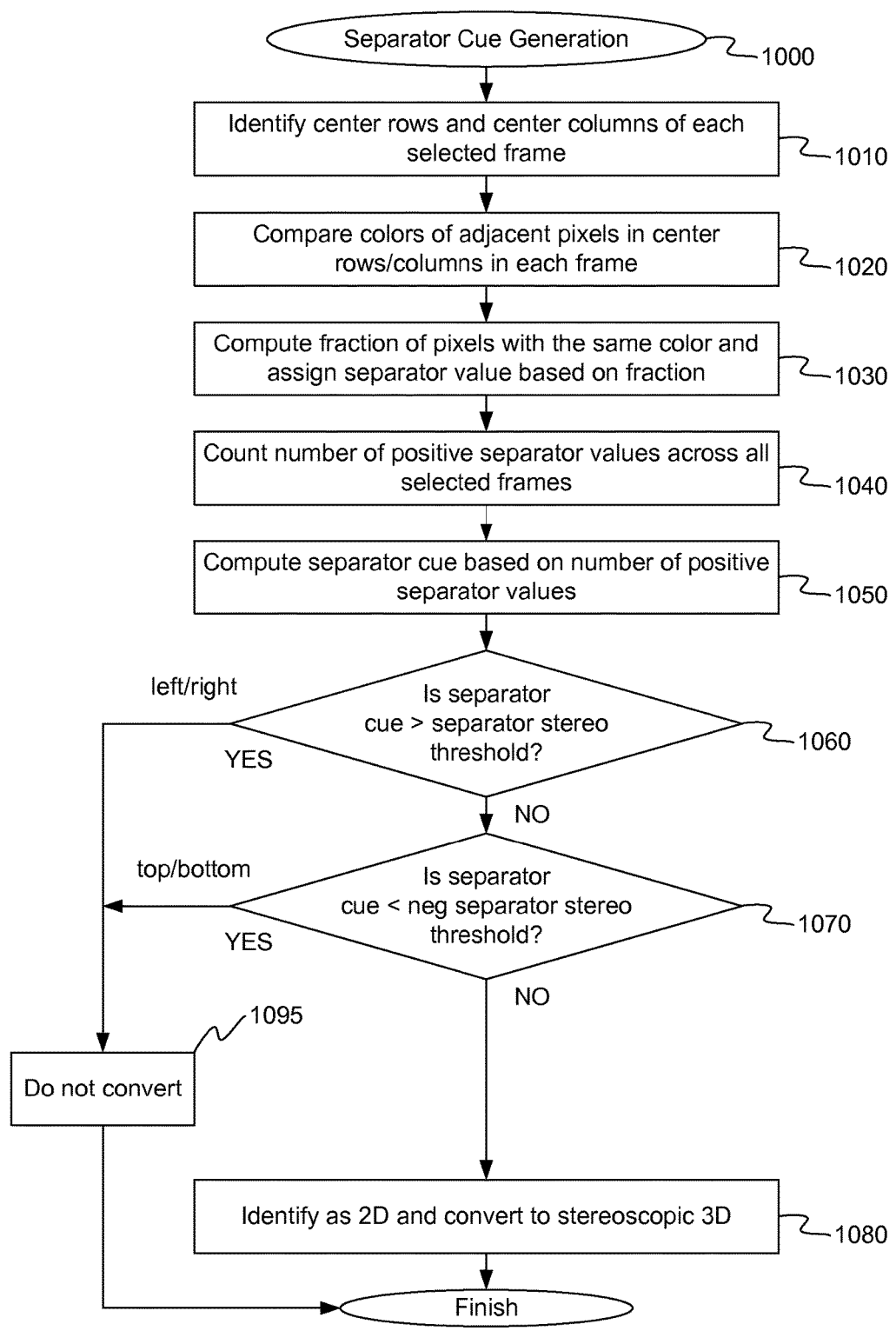
FIG. 10 is a flow diagram illustrating a separator cue generation method, according to some implementations.

FIG. 10 is a flow diagram illustrating a separator cue generation method, according to some implementations of the present disclosure. The method 1000 may be performed by processing logic that comprises hardware (e.g., circuitry, dedicated logic, programmable logic, microcode, etc.), software (e.g., instructions run on a processing device to perform hardware simulation), or a combination thereof. The method 1000 can generate a separator visual cue for use in determining whether an input video is monoscopic. In one implementation, method 1000 may be performed by suitability detector 105, as shown in FIGS. 1 and 2.

Referring to FIG. 10, at block 1010, method 1000 identifies the center rows and center columns of each selected frame of the input video as described above. At block 1020, method 1000 compares the colors of adjacent pixels in the center rows and center columns of each selected frame of the input video. Along each of the center rows and center columns, separator cue module 225 compares the colors of adjacent pixels. Using the example above, separator cue module 225 may compare the color values of adjacent pixels in columns 512 and 513 to determine if the color values are the same.

At block 1030, method 1000 computes a fraction of those pixels along the center rows and center columns with the same color and assigns a color separator value based on the fraction for each selected frame of the input video. In one implementation, if the fraction of same color pixels is greater than or equal to the separator threshold (e.g. 75%), the separator value may be 1 (or some other high value). Otherwise, the separator value may be zero (or some other low value).

At block 1040, method 1000 counts the number of positive separator values across all of the selected frames of the input video. In one implementation, separator cue module 225 can count the number of positive separator values (e.g., 1's) across the set of selected frames.

At block 1050, method 1000 computes a separator cue based on the number of positive separator values. In one implementation, the separator cue is defined as the number of left/right separator values minus the number of top/bottom separator values. That result may be divided by the sum of the number of separator values for the top/bottom halves and the left/right halves to normalize the separator cue value. In general, if the frames of the input video include stereo image pairs in the left/right orientation with a constant color separator, the number of left/right separator values is expected to be relatively high. In addition, if the frames of the input video include stereo image pairs in the top/bottom orientation, the number top/bottom separator values is expected to be relatively high. Therefore, in general, the separator cue will likely be a positive value for frames arranged in the left/right configuration (as the number of top/bottom separator values may be small, while the number of left/right separator values is large). Also, the separator cue will likely be a negative value for frames arranged in the top/bottom configuration (as the number of top/bottom separator values is large, while the number of left/right separator values may be small). In other implementations, the separator cue may be calculated in some other manner.

At block 1060, method 1000 determines whether the separator cue is greater than a separator stereo threshold. In one implementation, the separator stereo threshold is a value used to define the left/right stereo image pair configuration. Threshold comparison module 230 may compare the separator cue computed at block 1050 to the separator stereo threshold. If the separator cue is greater than or equal to the separator stereo threshold, threshold comparison module 230 may determine that the input video is stereoscopic with a left/right stereo image pair orientation. The separator stereo threshold may be an adjustable value that can be configured according to user preferences. If at block 1060, method 1000 determines that the separator cue is greater than the separator stereo threshold, method 1000 identifies the input video as stereoscopic having a left/right stereo image pair orientation, and at block 1095, does not convert the input video to 3D.

If at block 1060, method 1000 determines that the separator cue is not greater than the separator stereo threshold, at block 1070, method 1000 determines whether the separator cue is less than a negative separator stereo threshold. In one implementation, the negative separator stereo threshold is a value used to define the top/bottom stereo image pair configuration. Threshold comparison module 230 may compare the separator cue computed at block 1050 to the negative separator stereo threshold. If the separator cue is less than or equal to the negative separator stereo threshold, threshold comparison module 230 may determine that the input video is stereoscopic with a top/bottom stereo image pair orientation. The negative separator stereo threshold may be an adjustable value that can be configured according to user preferences.

If at block 1070, method 1000 determines that the separator cue is less than the negative separator stereo threshold, method 1000 identifies the input video as stereoscopic having a top/bottom stereo image pair orientation, and at block 1095, does not convert the input video to 3D. If at block 1070, method 1000 determines that the separator cue is not less than the negative separator stereo threshold, at block 1080, method 1000 identifies the input video as monoscopic and automatically converts the input video to stereoscopic 3D.

Figure 11:
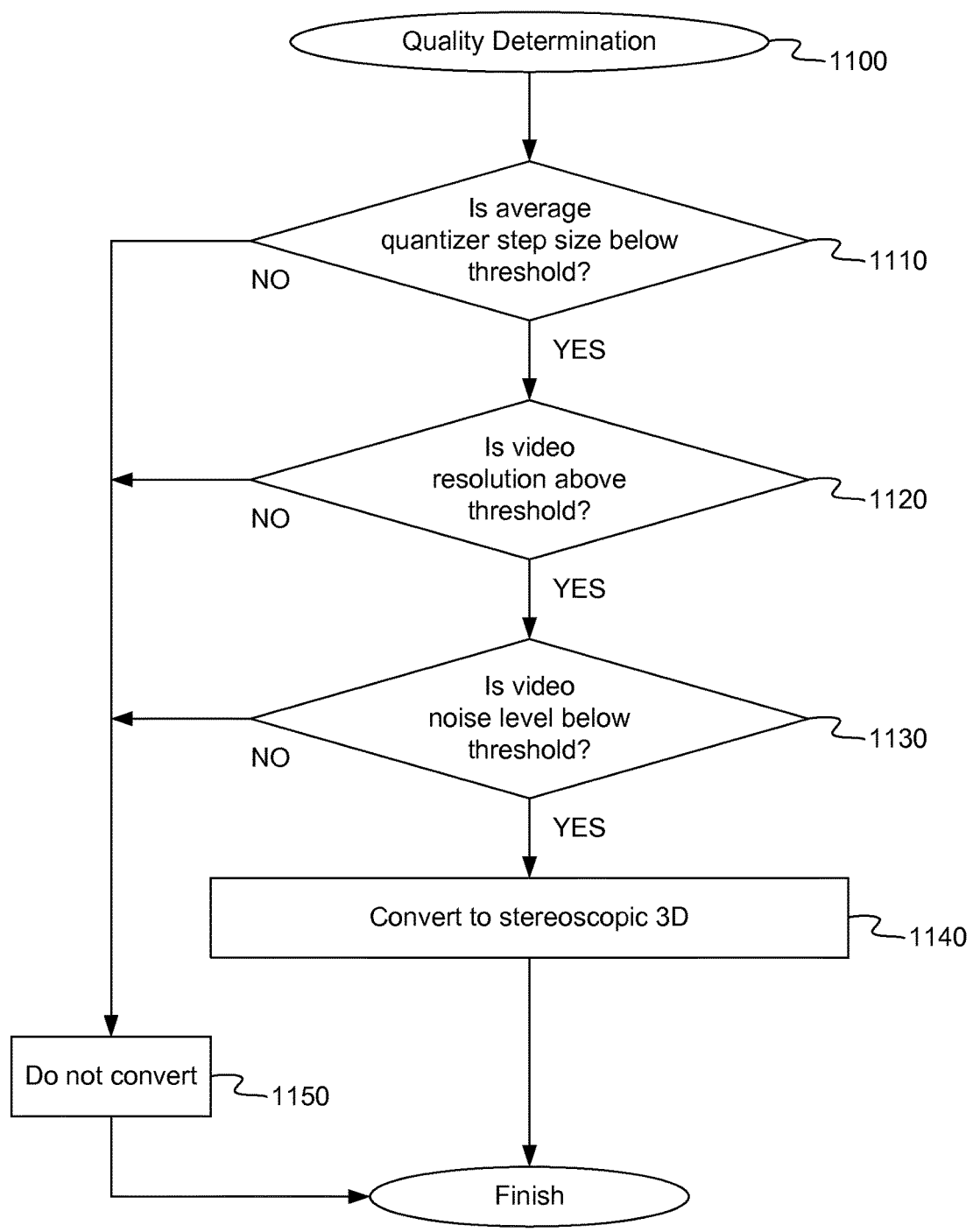
FIG. 11 is a flow diagram illustrating a video quality determination method, according to some implementations.

FIG. 11 is a flow diagram illustrating a video quality determination method, according to some implementations. The method 1100 may be performed by processing logic that comprises hardware (e.g., circuitry, dedicated logic, programmable logic, microcode, etc.), software (e.g., instructions run on a processing device to perform hardware simulation), or a combination thereof. The method 1100 can determine a quality level of an input video for use in determining the suitability for converting a monoscopic video to stereoscopic 3D. In one implementation, method 1100 may be performed by suitability detector 105, as shown in FIGS. 1 and 2.

Referring to FIG. 11, at block 1110, method 1100 determines whether an average quantizer step size for the input video is below a quantizer threshold. In one implementation, video quality module 235 may decode the set of frames and determine an average quantizer step size. The step size of the quantizer may determine how much loss is encountered. By decoding a video, and gathering statistics, video quality module 235 may obtain a metric, such as the average quantizer step size over the video. For each format, video quality module 235 can compare the average quantizer step size against a threshold to determine if the quality of the video is good enough to be considered for 3D conversion. In general, if the average quantizer step size is large, then the video is of bad quality, and if the average size is small, then it has better quality. Thus, if the average quantizer step size is below the quantizer threshold, the video may be suitable for conversion to stereoscopic 3D.

If at block 1110, method 1100 determines that the average quantizer step size is below the quantizer threshold, at block 1120, method 1100 determines whether the video is above a resolution threshold. In one implementation, video quality module 235 may identify the resolution of the video from metadata associated with the video and compare the resolution to a resolution threshold. If the resolution of the input video is greater than or equal to the resolution threshold, video quality module 235 may determine that the input video is of sufficient quality for conversion to stereoscopic 3D. The resolution threshold may be an adjustable value that can be configured according to user preferences.

If at block 1120, method 1100 determines that the video resolution is above the resolution threshold, at block 1130, method 1100 determines whether the video noise level is below a noise threshold. In one implementation, video quality module 235 may estimate the noise level of the video using a noise estimator and compare the noise estimate to a noise threshold. If the noise estimate of the input video is less than or equal to the noise threshold, video quality module 235 may determine that the input video is suitable for conversion to stereoscopic 3D. The noise threshold may be an adjustable value that can be configured according to user preferences.

If at block 1130, method 1100 determines that the video noise level is below the noise threshold, at block 1140, method 1100 automatically converts the input video to stereoscopic 3D. If at blocks 1110, 1120 or 1130, method 1100 determines that the quantizer step size, the video resolution or the video noise level does not meet the corresponding threshold, at block 1150, method 1100 does not convert the input video to 3D and method 1100 ends.

Figure 12:
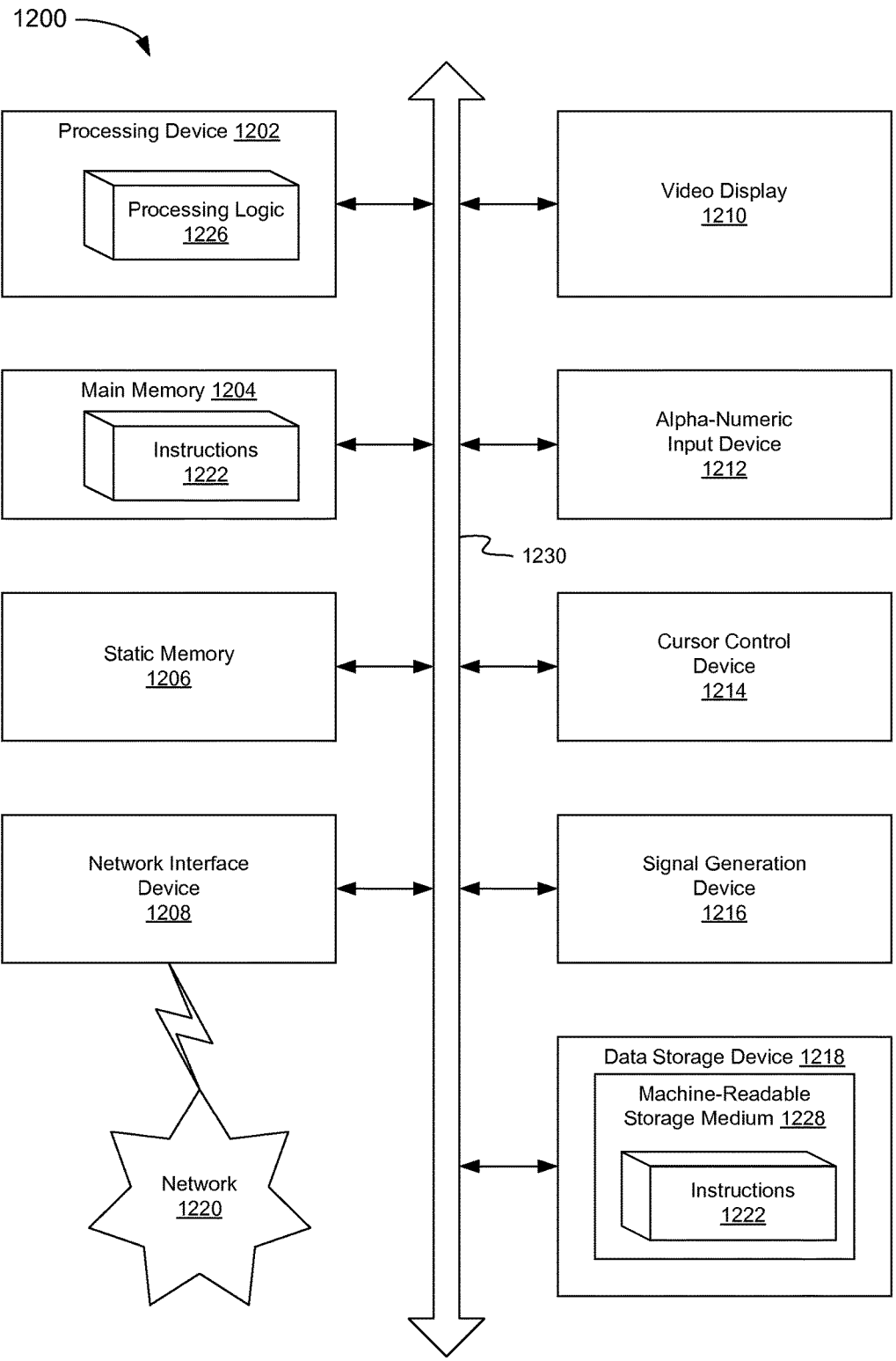
FIG. 12 is a block diagram illustrating an exemplary computer system, according to some implementations.

FIG. 12 illustrates a diagrammatic representation of a machine in the exemplary form of a computer system 1200 within which a set of instructions, for causing the machine to perform any one or more of the methodologies discussed herein, may be executed. In alternative implementations, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one implementation, computer system 1200 may be representative of computing device, such as server 102 running suitability detector 105.

In one implementation, the exemplary computer system 1200 includes a processing device 1202, a main memory 1204 (e.g., read-only memory (ROM), flash memory, dynamic random access memory (DRAM) (such as synchronous DRAM (SDRAM) or Rambus DRAM (RDRAM), etc.), a static memory 1206 (e.g., flash memory, static random access memory (SRAM), etc.), and a data storage device 1218, which communicate with each other via a bus 1230. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. The processing device 1202 is configured to execute processing logic 1226 for performing the operations and steps discussed herein.

The computer system 1200 may further include a network interface device 1208. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker).

The data storage device 1218 may include a machine-readable storage medium 1228, on which is stored one or more set of instructions 1222 (e.g., software) embodying any one or more of the methodologies of functions described herein. The instructions 1222 may also reside, completely or at least partially, within the main memory 1204 and/or within the processing device 1202 during execution thereof by the computer system 1200; the main memory 1204 and the processing device 1202 also constituting machine-readable storage media. The instructions 1222 may further be transmitted or received over a network 1220 via the network interface device 1208.

The machine-readable storage medium 1228 may also be used to store instructions to perform a method for detecting suitability for converting monoscopic visual content to stereoscopic 3D, as described herein. While the machine-readable storage medium 1228 is shown in an exemplary implementation to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several implementations of the present disclosure. It will be apparent to one skilled in the art, however, that at least some implementations of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one implementation" or "an implementation" means that a particular feature, structure, or characteristic described in connection with the implementations included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

What is claimed is:

1. A method comprising:
   identifying, by a processing device, a plurality of frames of an input video;
   determining, based on the plurality of frames, whether the input video is suitable for conversion from monoscopic visual content to stereoscopic 3D, wherein determining whether the input video is suitable for conversion comprises determining whether the input video is monoscopic, and wherein determining whether the input video is monoscopic comprises:
      identifying a set of edge pixels in each of the plurality of frames of the input video,
      calculating an edge cue for the input video using sets of edge pixels across the plurality of frames of the input video, and
      determining whether the edge cue for the input video satisfies one or more stereo threshold conditions that define whether the input video is monoscopic; and
   in response to determining the input video is suitable for conversion, causing the input video to be converted to stereoscopic 3D; and in response to determining the input video is not suitable for conversion, causing the input video not to be converted to stereoscopic 3D.

2. The method of claim 1, wherein determining whether the input video is suitable for conversion further comprises:
generating a first color histogram for a first portion of each of the plurality of frames, a second color histogram for a second portion of each of the plurality of frames, a third color histogram for a third portion of each of the plurality of frames and a fourth color histogram for a fourth portion of each of the plurality of frames;
determining a first histogram distance between the first color histogram and the second color histogram and a second histogram distance between the third color histogram and the fourth color histogram for each of the plurality of frames;
calculating a histogram cue based on an average first histogram distance and an average second histogram distance for the plurality of frames; and
comparing the histogram cue to a plurality of histogram thresholds to determine whether each of the plurality of frames comprises the stereo image pair.

3. The method of claim 2, wherein the first portion comprises a left half and the second portion comprises a right half, wherein the third portion comprises a top half and the fourth portion comprises a bottom half, and wherein the histogram cue comprises the average second histogram distance minus the average first histogram distance divided by the sum of the average histogram distances.

4. The method of claim 1, wherein calculating the edge cue comprises:
identifying two center columns and two center rows in each of the plurality of frames;
determining a fraction of pixels in the center columns and center rows that comprise edge pixels in each of the plurality of frames; and
calculating the edge cue based on an average fraction of edge pixels in the center columns and an average fraction of edge pixels in the center rows for the plurality of frames.

5. The method of claim 4, wherein the edge cue comprises the average fraction of edge pixels in the center columns minus the average fraction of edge pixels in the center rows divided by the sum of the average fractions of edge pixels.

6. The method of claim 1, wherein determining whether the input video is suitable for conversion further comprises:
identifying two center columns and two center rows in each of the plurality of frames;
determining a fraction of pixels in the center columns and center rows that have a same color value as an adjacent pixel in the center columns or center rows in each of the plurality of frames;
determining a number of the plurality of frames where the fraction of pixels in the center columns or center rows exceeds a first threshold;
calculating a separator cue based on the number of frames where the fraction of pixels in the center columns or center rows exceeds the first threshold; and
comparing the separator cue to a plurality of separator thresholds to determine whether each of the plurality of frames comprises the stereo image pair.

7. The method of claim 6, wherein the separator cue comprises the number of frames where the fraction of pixels in the center columns exceeds the first threshold minus the number of frames where the fraction of pixels in the center rows exceeds the first threshold, divided by the sum of the number of frames where the fraction of pixels exceeds the first threshold in the center columns and the center rows.

8. The method of claim 1, wherein determining whether the input video is suitable for conversion further comprises determining whether at least one of a size of the input video satisfies a time threshold condition, or a visual quality of the input video satisfies one or more quality threshold conditions based on at least one of an average quantizer step size of the plurality of frames, a video resolution of the input video, or a noise level of the input video.

9. A computer system comprising:
a processing device;
a memory coupled to the processing device; and
a suitability detector, executable by the processing device from the memory, to:
identify a plurality of frames of an input video;
determine, based on the plurality of frames, whether the input video is suitable for conversion from monoscopic visual content to stereoscopic 3D, wherein to determine whether the input video is suitable for conversion, the suitability detector is to determine whether the input video is monoscopic, and wherein to determine whether the input video is monoscopic, the suitability detector is to:
identify a set of edge pixels in each of the plurality of frames of the input video,
calculate an edge cue for the input video using sets of edge pixels across the plurality of frames of the input video, and
determine whether the edge cue for the input video satisfies one or more stereo threshold conditions that define whether the input video is monoscopic; and
in response to determining the input video is suitable for conversion, cause the input video to be converted to stereoscopic 3D; and
in response to determining the input video is not suitable for conversion, cause the input video not to be converted to stereoscopic 3D.

10. The computer system of claim 9, wherein to determine whether the input video is suitable for conversion, the suitability detector is further to identify whether each of the plurality of frames comprises the stereo image pair in a known orientation.

11. The computer system of claim 9, wherein to determine whether the input video is suitable for conversion, the suitability detector is further to determine whether a histogram cue satisfies one or more histogram threshold conditions, wherein the histogram cue is based on a comparison of color values of pixels found in left and right sections of each of the plurality of frames and found in top and bottom sections of each of the plurality of frames.

12. The computer system of claim 9, wherein the edge cue is based on the presence of an image edge located along a horizontal center or a vertical center in at least a portion of the plurality of frames.

13. The computer system of claim 9, wherein to determine whether the input video is suitable for conversion, the suitability detector is further to determine whether a separator cue satisfies one or more separator threshold conditions, wherein the separator cue is based on the presence of a constant-color separator along a horizontal center or a vertical center in at least a portion of the plurality of frames.

14. The computer system of claim 9, wherein to determine whether the input video is suitable for conversion, the suitability detector is further to determine whether at least one of a size of the input video satisfies a time threshold condition, or a visual quality of the input video satisfies one or more quality threshold conditions based on at least one of an average quantizer step size of the plurality of frames, a video resolution of the input video, or a noise level of the input video.

15. A non-transitory machine-readable storage medium storing instructions which, when executed, cause a processing device to perform operations comprising:
- identifying, by the processing device, a plurality of frames of an input video;
- determining, based on the plurality of frames, whether the input video is suitable for conversion from monoscopic visual content to stereoscopic 3D, wherein determining whether the input video is suitable for conversion comprises determining whether the input video is monoscopic, and wherein determining whether the input video is monoscopic comprises:
  - identifying a set of edge pixels in each of the plurality of frames of the input video,
  - calculating an edge cue for the input video using sets of edge pixels across the plurality of frames of the input video, and
  - determining whether the edge cue for the input video satisfies one or more stereo threshold conditions that define whether the input video is monoscopic; and
- in response to determining the input video is suitable for conversion, causing the input video to be converted to stereoscopic 3D; and
- in response to determining the input video is not suitable for conversion, causing the input video not to be converted to stereoscopic 3D.

16. The non-transitory machine-readable storage medium of claim 15, wherein determining whether the input video is suitable for conversion further comprises identifying whether each of the plurality of frames comprises the stereo image pair in a known orientation.

17. The non-transitory machine-readable storage medium of claim 15, wherein determining whether the input video is suitable for conversion further comprises determining whether a histogram cue satisfies one or more histogram threshold conditions, wherein the histogram cue is based on a comparison of color values of pixels found in left and right sections of each of the plurality of frames and found in top and bottom sections of each of the plurality of frames.

18. The non-transitory machine-readable storage medium of claim 15, wherein the edge cue is based on the presence of an image edge located along a horizontal center or a vertical center in at least a portion of the plurality of frames.

19. The non-transitory machine-readable storage medium of claim 15, wherein determining whether the input video is suitable for conversion further comprises determining whether a separator cue satisfies one or more separator threshold conditions, wherein the separator cue is based on the presence of a constant-color separator along a horizontal center or a vertical center in at least a portion of the plurality of frames.

20. The non-transitory machine-readable storage medium of claim 15, wherein determining whether the input video is suitable for conversion further comprises determining whether at least one of a size of the input video satisfies a time threshold condition, or a visual quality of the input video satisfies one or more quality threshold conditions, wherein the visual quality of the plurality of frames is based on at least one of an average quantizer step size of the plurality of frames, a video resolution of the plurality of frames, or a noise level of the plurality of frames.

21. A method comprising:
- identifying, by a processing device, a plurality of frames of an input video;
- determining, based on the plurality of frames, whether the input video is suitable for conversion from monoscopic visual content to stereoscopic 3D, wherein determining whether the input video is suitable for conversion comprises determining whether the input video is monoscopic, and wherein determining whether the input video is monoscopic comprises:
  - identifying pixels having a same color value in a center of each of the plurality of frames of the input video,
  - calculating a separator cue for the input video in view of identified pixels with same pixel values across the plurality of frames of the input video, and
  - determining whether the separator cue for the input video satisfies one or more stereo threshold conditions that define whether the input video is monoscopic; and
- in response to determining the input video is suitable for conversion, causing the input video to be converted to stereoscopic 3D; and
- in response to determining the input video is not suitable for conversion, causing the input video not to be converted to stereoscopic 3D.

22. The method of claim 21, wherein identifying pixels having the same color value in the center of each of the plurality of frames comprises:
- identifying two center columns and two center rows in each of the plurality of frames; and
- comparing color values of adjacent pixels in the two center columns and the two center rows in each of the plurality of frames.

23. The method of claim 21, wherein calculating the separator cue for the input video comprises:
- determining a fraction of pixels in the two center columns and the two center rows that have the same color value as adjacent pixels in the two center columns or the two center rows in each of the plurality of frames;
- determining a number of the plurality of frames where the fraction of pixels in the two center columns or the two center rows exceeds a first separator threshold; and
- calculating the separator cue based on the number of frames where the fraction of pixels in the two center columns or the two center rows exceeds the first separator threshold.

* * * * *